No. 730,397. PATENTED JUNE 9, 1903.
W. H. PRATT.
POWER FACTOR INDICATOR.
APPLICATION FILED MAR. 26, 1903.
NO MODEL.

Witnesses.
George W. Tilden.
Helen Orford

Inventor.
William H. Pratt.
by Albert G. Davis
Att'y.

No. 730,397. Patented June 9, 1903.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

POWER-FACTOR INDICATOR.

SPECIFICATION forming part of Letters Patent No. 730,397, dated June 9, 1903.

Application filed March 26, 1903. Serial No. 149,674. (No model.)

*To all whom it may concern:*

Be it known that I, WILLIAM H. PRATT, a citizen of the United States, residing at Lynn, county of Essex, State of Massachusetts, have invented certain new and useful Improvements in Power-Factor Indicators, of which the following is a specification.

My invention relates to electric measuring instruments, and more especially to that type of instrument used for measuring the power factor of an alternating-current circuit.

The invention is intended more especially to eliminate errors due to changes in frequency of the alternating current in the circuit to which the indicator may be applied, and it embodies various novel features of invention, which I have pointed out with particularity in the appended claims.

The invention itself will best be understood by reference to the following specification, taken in connection with the accompanying drawings, in which—

Figure 1:
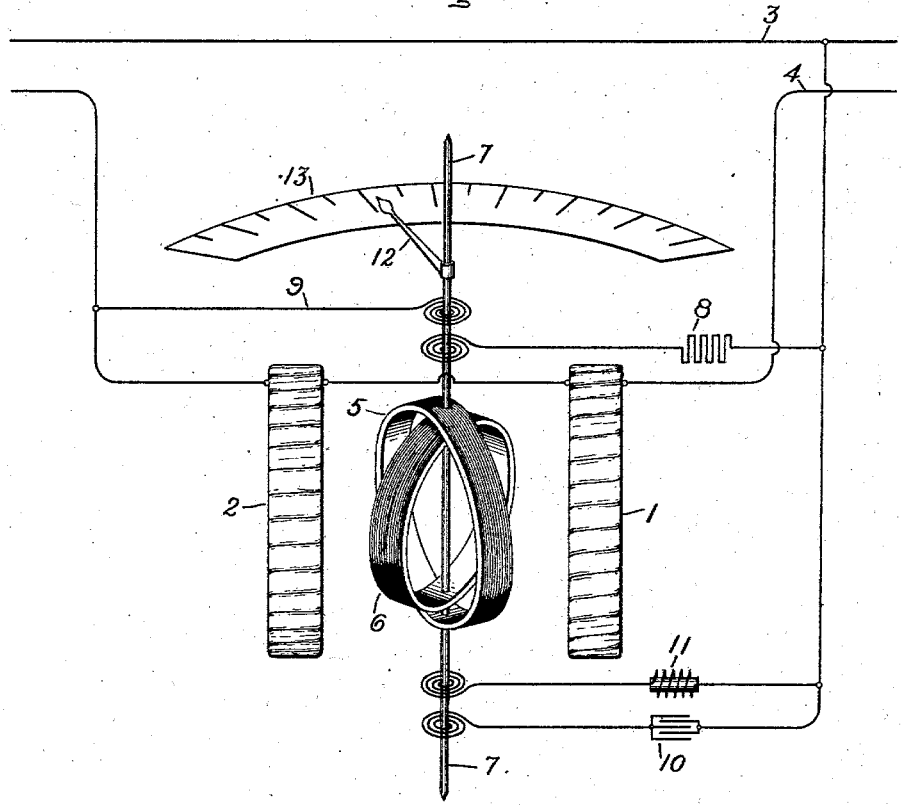
Figure 2:
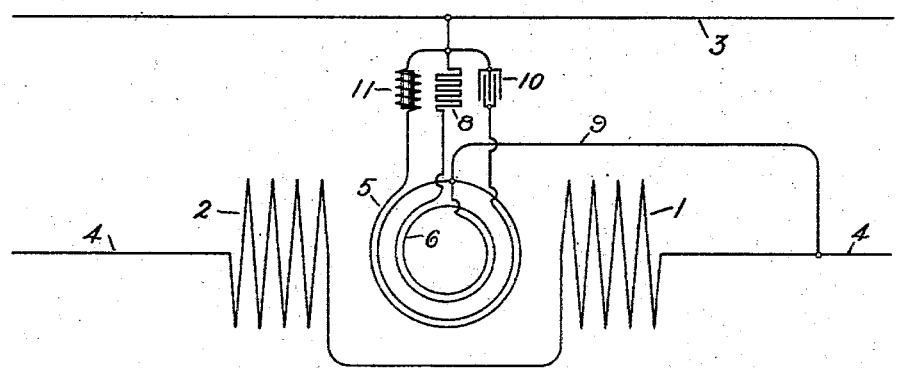

Figure 1 is intended as an illustration of one of the many forms which my invention may assume, and Fig. 2 a diagram of the circuits of the instrument represented in Fig. 1.

The indicating device shown in the drawings comprises two relatively movable members, in one of which the main current of the system, or at least a portion or part thereof, is caused to flow. As shown, the main-current-carrying member consists of two current-coils 1 and 2, connected in series with one of the mains 3 4 of the alternating-current system. Located within the field produced by current in the coils 1 and 2 are two coils 5 and 6. These coils 5 and 6 are carried upon a pivoted shaft 7 and are angularly displaced from each other, as indicated. One of the coils—as, for example, the coil 6—is connected across the mains 3 4 and is provided with a non-inductive resistance 8, in series therewith. The current flowing in this coil is therefore approximately in phase with the electromotive force impressed thereon. The other coil 5 has a wire or tap brought out from its middle point and connected, by means of a conductor 9, to one of the supply-mains—as, for example, the main 4. The two terminals of the coil are connected one through a condenser 10 and the other through an inductance-coil 11 to the other main 3. The current flowing in one half of the winding or coil 5 therefore lags approximately ninety degrees behind its electromotive force, while the current flowing in the other half is advanced in phase by substantially the same amount. The currents in the two halves of the winding therefore differ in phase from each other by an angle approximating one hundred and eighty degrees. Since the direction of flow of current in one half of the winding is opposite the direction of flow in the other half, it follows that the magnetomotive forces of the currents in the two halves of the coil are added to each other. The magnetic fields produced by the coils 5 and 6 are therefore displaced in phase from each other by approximately ninety degrees. These coils are acted upon by the magnetic field due to the series coils 1 and 2 and turn upon their axis of rotation until they assume a position where the turning moment of one is balanced by the turning moment exerted upon the other. As the current in the current-coils 1 and 2 shifts in phase with respect to the impressed electromotive force of the circuit the rotatable coils move backward or forward in correspondence with the shifting in phase of current, the angular deflection or position of the movable member thus serving as a measure of the power factor of the circuit. The movable member has no restraining force applied thereto and is free to assume such angular position as will bring the turning moment exerted upon the two coils into equilibrium. This position is not affected by changes in the flow of current in the current-coil, because this current acts equally upon the two coils of the movable member, nor is it affected by changes in voltage upon the circuit, since such changes of voltage act equally upon the two coils of the current-carrying member.

The instrument is responsive only to the shifting of phase of the main current in the current-coils 1 and 2. The instrument thus measures the phase displacement of the current in the circuit, or, in other words, the power factor, the indications being afforded by means of a pointer 12 or other indicating device moving over its scale 13. Changes in frequency of the alternating current, provided these changes be not excessive, do not affect the readings of the instrument. A change of frequency has of course no effect upon the non-inductive circuit of the coil 6. In the other coil 5 a change of frequency causes an increase of current in one half of the coil and a decrease in the other, the resulting ampere-turns of the coil thus remaining substantially unchanged. Where the changes in frequency are not too great, the resulting indications of the instrument are not affected thereby. The instrument may therefore be calibrated to read power factor and the readings will within limits be independent of frequency.

What I claim as new, and desire to secure by Letters Patent of the United States, is—

1. In a power-factor indicator, the combination of two current-carrying members one of which is adapted to turn relatively to the other into a position of equilibrium, means for supplying alternating current to said members, means for indicating the angular position of one member relatively to the other, and means for rendering the indications independent of changes of frequency of said alternating current.

2. In an indicating instrument, the combination of fixed current-carrying coils, a movable member having two angularly-displaced coils, means for passing current of a given phase through one of said angularly-displaced coils, and means for passing currents of relatively displaced phase through portions of the other of said angularly-displaced coils.

3. In a power-factor indicator, the combination of two relatively movable members, one of which is provided with angularly-displaced coils in fixed relation to each other, and means for supplying to one of said coils currents which vary with changes in frequency of the alternating-current system to which the indicator is applied in such manner that the electromagnetic effect of the currents is approximately constant.

4. In a power-factor indicator, the combination of angularly-displaced coils in fixed relation to each other, means for supplying to one of said coils current in phase with the impressed electromotive force of the system in connection with which the power-factor indicator is used, and means for supplying to another of said coils currents which respectively lag and lead with respect to said electromotive forces.

In witness whereof I have hereunto set my hand this 24th day of March, 1903.

WILLIAM H. PRATT.

Witnesses:
DUGALD McK. McKILLOP,
JOHN A. McMANUS.